United States Patent
Cohn et al.

(10) Patent No.: US 8,855,672 B1
(45) Date of Patent: Oct. 7, 2014

(54) KEY LOCATOR DEVICE

(76) Inventors: Clayton A. Cohn, Los Angeles, CA (US); David Espinoza, Los Angeles, CA (US)

( * ) Notice: Subject to any disclaimer, the term of this patent is extended or adjusted under 35 U.S.C. 154(b) by 204 days.

(21) Appl. No.: 13/540,687

(22) Filed: Jul. 3, 2012

Related U.S. Application Data

(60) Provisional application No. 61/509,475, filed on Jul. 19, 2011.

(51) Int. Cl.
*H04W 24/00* (2009.01)

(52) U.S. Cl.
USPC ............. 455/456.1; 455/41.2; 455/550.1

(58) Field of Classification Search
CPC ................. H04L 67/18; H04W 4/02
USPC .......... 455/456.1–457, 41.2, 550.1, 455/575.1–575.9
See application file for complete search history.

(56) References Cited

U.S. PATENT DOCUMENTS

| | | | |
|---|---|---|---|
| 7,453,357 B2 * | 11/2008 | Bernal-Silva et al. ... | 340/539.32 |
| 8,254,958 B2 * | 8/2012 | Johnson .................. | 455/456.1 |
| 2007/0030147 A1 * | 2/2007 | Hamolsky ................. | 340/539.32 |
| 2007/0222592 A1 * | 9/2007 | Zelman ..................... | 340/539.32 |
| 2008/0020782 A1 * | 1/2008 | Nasser ....................... | 455/456.1 |

FOREIGN PATENT DOCUMENTS

CN         201011889 Y  *  1/2008  ............... G02F 1/13

* cited by examiner

*Primary Examiner* — Sharad Rampuria

(74) *Attorney, Agent, or Firm* — Kyle A. Fletcher, Esq.

(57) ABSTRACT

The key locator device integrates two forms of locating means therein so as to provide location-based services and/or paging means and alarms for locating the key locator device. The locating means include a GPS locating means and a cellular transceiver such that the location of the key locator device may be determined via GPS whereas a paging function in association with an audible alarm may be accomplished via the cellular transceiver. The key locator device includes a caller ID strip that illuminates to display a phone number when so paged. The GPS locating means may provide location-based data of the key locator device remotely via transceiver to a smart phone or computer. The key locator device may include a vibrating means and/or speaker to produce a vibratory and/or audible alarm when so paged.

15 Claims, 3 Drawing Sheets

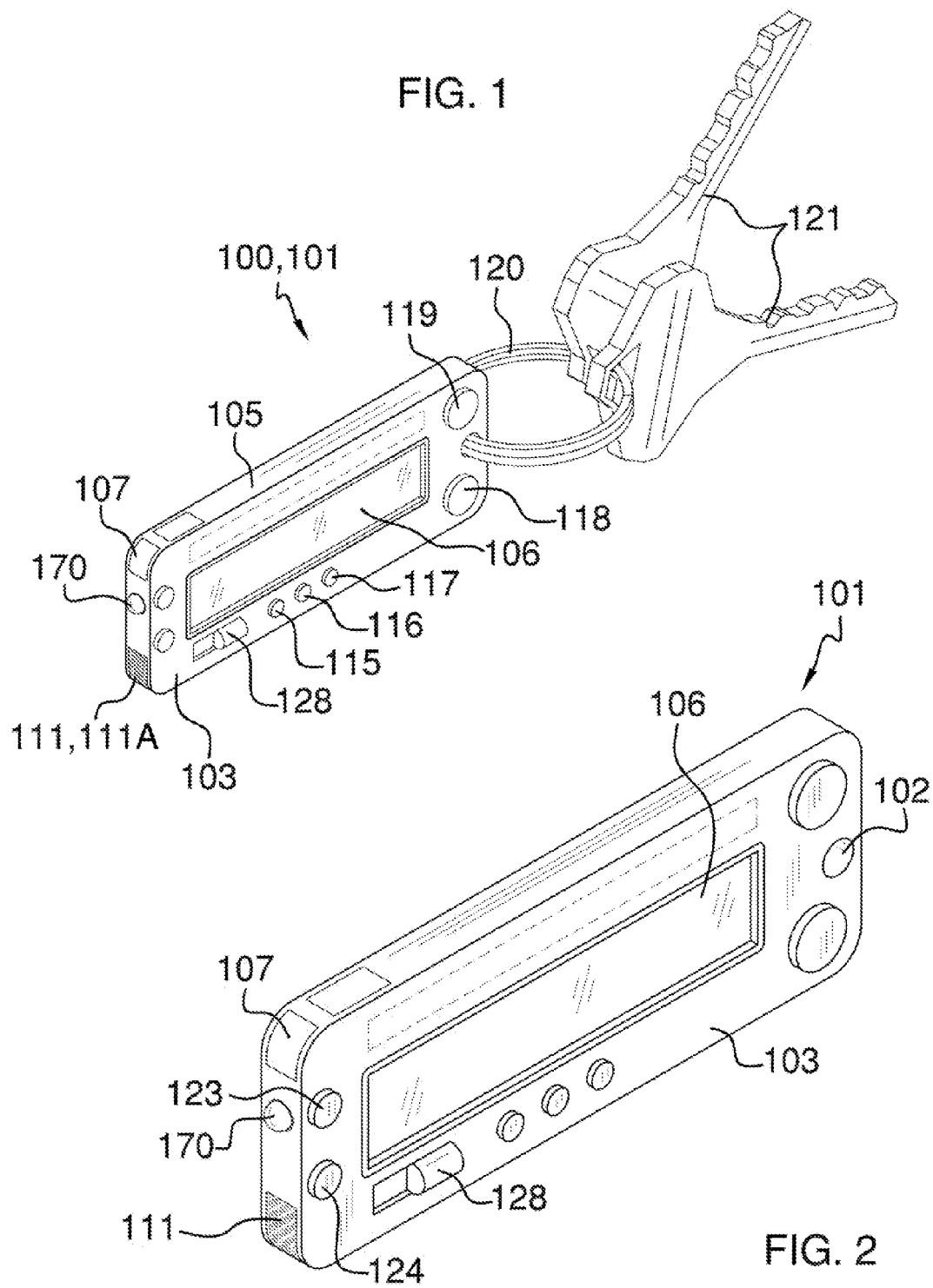

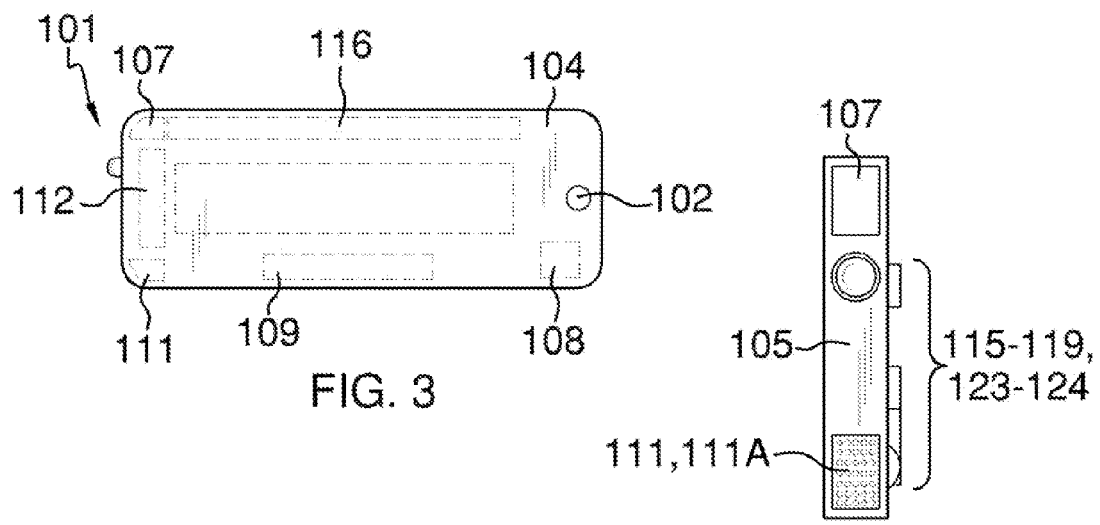
FIG. 3
FIG. 4
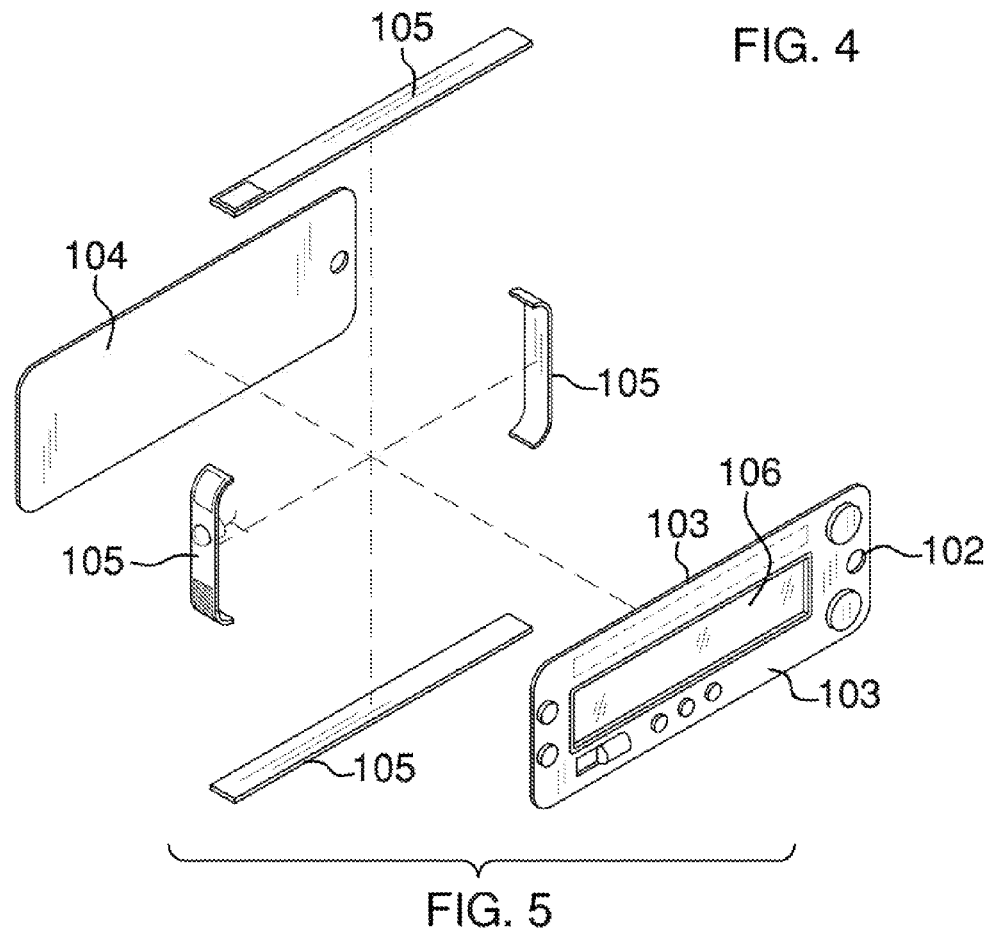
FIG. 5

KEY LOCATOR DEVICE

CROSS REFERENCES TO RELATED APPLICATIONS

This application is a non-provisional utility patent application claiming priority to a provisional application No. 61/509,475, which was filed on Jul. 19, 2011.

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of key chain accessories, more specifically, a locator device for a keychain, which provides multiple means of locating a key chain and attached keys or any item connected to said key chain.

Keychains are invaluable when it comes to storing a plurality of keys together. However, keychains and keys are relatively small and pose a problem when lost. There have been many attempts to address the need to locate a lost keychain, which includes the use of locating means and audible alarms. The prior art is limited to short range locators that only work within a few hundred feet, and do not employ long range locators.

What is more needed is a key locator device that employs multiple means for location of the key locator device and the attached keychain. Moreover, what is further needed is a locating means that may or may not issue an audible alarm associated with the location of the key locator device in that the locating means may provide location based services to someone whom simply wants to know the location of the key locator device regardless of whether the key locator device is lost. It shall be noted that the use of the global positioning system (GPS) locator device provides location based services to a parent who wants to know the location of a child that is in possession of the keys attached to the keychain.

The device of the present application seeks to address all needs associated with a keychain by providing a key locator device that provides two forms of locating means in association therewith. Moreover, the device of the present application provides two modes of locating means that enable the location of the key locator device to be identified for monitoring purposes irrespective of whether the keys are actually lost and/or for actually locating the key locator device via an audible alarm or vibrating mechanism integrated therein in communication with a caller ID strip that pages the telephone number of the individual paging the lost key locator device.

B. Discussion of the Prior Art

As will be discussed immediately below, no prior art discloses a key locator device that integrates two forms of locating means comprising a GPS locating means and a cellular transceiver such that the geographical location of the key locator device may be identified and/or to generate an alarm to aid in finding the key locator device when so lost; the key locator device includes a relatively small housing that includes a hole through which a keychain may be engaged thereon; wherein the housing stores a processing means for communication with a GPS locating means and a cellular transceiver so as to generate location based data irrespective of whether the key locator device is lost or not as a means of location monitoring or as a literal means of generating an alarm to track down the location of the key locator device when so lost; wherein the housing includes a caller ID strip such that when a paging function associated with the cellular transceiver shall indicate the telephone number of which most recently paged to the person who found the lost key locator device to call said number so that the owner may retrieve the lost keys.

The Nasser Patent Application Publication (U.S. Pub. No. 2008/0020782) discloses a system for finding lost articles such as keys that includes a receiving unit that is physically attached to the article and programmed to activate upon receipt of a unique code transmitted via a wireless communications network, that when activated, the receiving unit emits an audible signal and simultaneously, or after a programmed delay, activates a digital display with the owner's contact information. However, the system is not uniquely adapted for retrieving lost keys and in combined use with a GPS system.

The Lim Patent Application Publication (U.S. Pub. No. 2007/0030164) discloses a multi-remote controller for easily locating "paging objects" such as a car key, a TV remote controller, etc, using one pager and a plurality of receivers connected to the pading objects, for receiving signals from the pager. Again, the controller is not uniquely adapted for retrieving lost keys and in combined use with a GPS system.

The Davide Patent Application Publication (U.S. Pub. No. 2010/0214095) discloses a system for locating a misplaced article wherein the transmitter is a cellular phone. However, the system does not combine the use of a cellular transceiver for paging a locator device and a GPS unit that remotely locates the respective keychain.

The Benvenuti Patent (U.S. Pat. No. 6,166,652) discloses a system for lost keys that includes an attachable sound generating device that is activated by a beeper circuit via a telephone call. Again, the device is not uniquely adapted to work in conjunction with a GPS unit to remotely provide the location of the keys irrespective of whether the keys are lost.

The Hamolsky Patent (U.S. Pat. No. 7,230,533) discloses a key chain locator, consisting of a cell phone receiver programmed to receive an incoming telephone call and actuate a ringer to produce a sound. Again, the locator does not include a GPS locating means for remotely providing location based information as to the key chain locator, regardless of whether the key chain locator is lost or not.

The Park Patent (U.S. Pat. No. 6,075,456) discloses a method and apparatus for indicating the location of a lost or misplaced paging receiver and the owner's telephone number. Again, the pager receiver is not functionally able to divulge location based information remotely via a GPS locating means integrated therein.

The Ritter Patent (U.S. Pat. No. 7,420,465) discloses a method for finding lost or stolen objects by sending an SMS. However, the method does not integrate steps involving the use of a GPS locating means that access remotely the location of the respective lost objects regardless of whether said objects are actually lost.

While the above-described devices fulfill their respective and particular objects and requirements, they do not describe a key locator device that integrates two forms of locating means comprising a GPS locating means and a cellular transceiver such that the geographical location of the key locator device may be identified and/or to generate an alarm to aid in finding the key locator device when so lost; the key locator device includes a relatively small housing that includes a hole through which a keychain may be engaged thereon; wherein the housing stores a processing means for communication with a GPS locating means and a cellular transceiver so as to generate location based data irrespective of whether the key locator device is lost or not as a means of location monitoring or as a literal means of generating an alarm to track down the location of the key locator device when so lost; wherein the housing includes a caller ID strip such that when a paging function associated with the cellular transceiver shall indicate the telephone number of which most recently paged to the person who found the lost key locator device to call said number so that the owner may retrieve the lost keys. In this regard, the key locator device departs from the conventional concepts and designs of the prior art.

SUMMARY OF THE INVENTION

The key locator device integrates two forms of locating means therein so as to provide location-based services and/or paging means and alarms for locating the key locator device. The locating means include a GPS locating means and a cellular transceiver such that the location of the key locator device may be determined via GPS whereas a paging function in association with an audible alarm may be accomplished via the cellular transceiver. The key locator device features a relatively small housing that fits on a keychain in between one or more key, and includes a caller ID strip that illuminates to display a phone number when so paged. The GPS locating means may provide location-based data of the key locator device remotely via a smart phone or computer. The key locator device may include a vibrating means and/or speaker and/or lighting means to produce a vibratory and/or audible alarm and/or visual alarm when so paged such that the physical location may be determined in connection with providing said paging function.

An object of the invention is to provide a key locator device that can generate location based data via a GPS locating means in conjunction with or without a paging function that works with a cellular transceiver.

Another object of the invention is to provide a paging function that produces a vibratory alarm and/or audible alarm in conjunction with a caller ID strip that displays a telephone number for use to call in order to return the lost keys to an owner.

A further object of the invention is to provide a paging function that can aid the owner in locating the lost key locator device by hearing or feeling the audible or vibratory alarm and/or seeing a blinking lighting means, and which does not require the use of a second person who happens to find the lost keys.

Another object of the invention is to include a GPS locating means that enables an end user to determine the physical location of the item(s) attached to the key locator device wherein the item(s) are not actually lost.

Another object of the invention is to house the key locator device in a housing that is relatively small in comparison to keys stored on a keychain thereby minimalizing the overall weight of all items attached to said keychain.

Another object of the invention is to provide a processing means that is in wired communication with the GPS locating means and the cellular transceiver such that all locating means are wired via a single powering means, and are intercommunicative of one another when using the paging function simultaneously with the GPS locating means.

Another object of the invention is to provide a housing that is waterproof and buoyant such that the device can float in water.

An even further object of the invention is to enable the physical location of the key locator device to be determined remotely via a smart phone and/or computer by tracking the GPS locating means remotely, and which operates via a smart phone application or applicable software.

Another object of the invention is to include a lighting means that works in conjunction with the processing means to emit a visual alarm for use with speaker, and or which may be solely used to provide illumination when so needed.

Another object of the invention is to include a solar panel on the housing to provide an auxiliary means of power generation for use with the processing means.

These together with additional objects, features and advantages of the key locator device will be readily apparent to those of ordinary skill in the art upon reading the following detailed description of presently preferred, but nonetheless illustrative, embodiments of the key locator device when taken in conjunction with the accompanying drawings.

In this respect, before explaining the current embodiments of the key locator device in detail, it is to be understood that the key locator device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the key locator device.

It is therefore important that the claims be regarded as including such equivalent construction insofar as they do not depart from the spirit and scope of the key locator device. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 1 illustrates a perspective view of the key locator device attached to a key ring for use in connection with a plurality of keys;

FIG. 2 illustrates a perspective view of the key locator device by itself;

FIG. 3 illustrates a rear view of the key locator device;

FIG. 4 illustrates a side view of the key locator device;

FIG. 5 illustrates an exploded view of the key locator device; and

DETAILED DESCRIPTION OF THE EMBODIMENT

Figure 6:
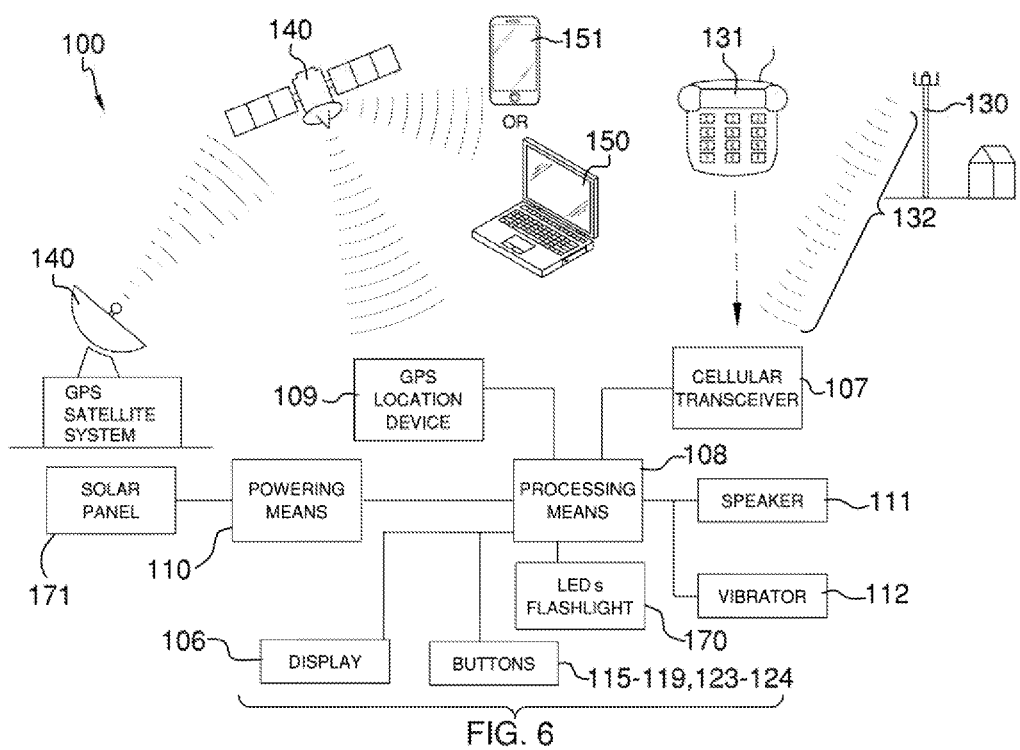
FIG. 6 illustrates a diagram of the various communication means used in connection with the key locator device and with a computer or smart phone in determining the location of the key locator device remotely.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to the preferred embodiment of the present invention, examples of which are illustrated in FIGS. 1-6. A key locator device 100 (hereinafter invention) includes a housing 101 having a keychain hole 102 through which a key chain ring 120 and keys 121 are connected therewith.

The housing 101 includes a front surface 103, a rear surface 104, and side surfaces 105. The front surface 103 and the rear surface 104 shall have a relatively small area and size to be not much longer than the keys 121. It shall be noted that the overall shape and size of the housing 101 needs to be relatively small and lightweight so as not to overburden the respective functionality and ease of use of the keys 121 or whatever is connected to the housing 101.

The front surface 103 includes a display 106 that is used to provide a telephone number or other applicable data that may be used when the invention 100 is lost. That being said, the invention 100 includes a cellular transceiver 107 that is located inside of the housing 101. The cellular transceiver 107 operates in a manner consistent with a pager, and which communicates with a cell phone tower 130 in order to receive a page from another telephone/cell phone 131. It should be noted that when the telephone/cell phone 131 pages the invention 100 via the cellular transceiver 107, other alarms (vibration, blinking light(s), or sound) may be produced within or on the housing 101 in order to alert persons in the vicinity of the invention 100 as to the location of the invention 100.

Referring to FIG. 6, it should be noted that the telephone/cell phone 131 may be in wired or wireless communication with the cell phone tower 130. Moreover, the cell phone tower 130 sends a transceiver signal 132 wirelessly to the cellular transceiver 107, and which generates the paging function with the invention 100. It shall be noted that the provisional application defines the cellular transceiver 107 herein as the telephone signal receiver, and that both are synonymous with one another.

The housing 101 also includes a processing means 108, which may be alternatively referred to as a central processing unit (CPU), which is in wired communication with the cellular transceiver 107 and a GPS locating means 109. The GPS locating means 109 may be alternatively be referred to as a GPS location device or a GPS unit. Essentially the GPS locating means 109 triangulates with GPS satellites 140 in order to determine the location of the invention 100. The GPS locating means 109 goes a step further by enabling remote operation of the GPS locating means 109 via a computer 150 or smart phone 151. It shall be noted that the smart phone 151 or computer 150 may interact with the GPS satellites 140 and/or with the GPS locating means 109 in order to determine the physical location of the invention 100 remotely. The ability to remotely locate the invention 100 is an important feature to the overall functionality of the invention 100 in that an end user may remotely locate the invention 100 even if the invention 100 is not actually lost. This feature may be desirable to a parent who wants to know where a child is actually located. This is especially true when the child is a new licensed teenage driver. This feature may also be applied to locating a lost pet wherein the invention 100 is secured to a collar or like use.

The cellular transceiver, the processing means 108, and the GPS locating means 109 are all housed within the housing 101, and are wired to a powering means 110. The powering means 110 may involve at least one battery, which is rechargeable as it will be continuously running the invention 100 in order to provide paging and location based services when in use.

The invention 100 also includes a speaker 111, which is wired to the processing means 108 in order to generate an audible alarm when the paging function is in use with the cellular transceiver 107. It shall be noted that when the cellular transceiver 107 is used to generate the paging function, the invention 100 itself may be relatively close to the individual making the paging function operate. In other words, an end user may have lost the invention 100 inside of his/her home, and by calling and paging the invention 100 via the cellular transceiver 107, said end user can locate the invention 100 inside of his/her home or wherever it is assuming it is within hearing distance or visible range of the end user.

The invention 100 may further include a vibrator 112, which is a standard component of most cellular telephones of today. The vibrator 112 may be for use with the speaker 111 or in lieu of the speaker 111, and may aid in alerting the end user or other person who found the invention 100 as to the paging information displayed on the display 106. It shall be noted from the provisional application that the term sound emitter is being used to refer to the speaker 111 defined herein. The speaker 111 shall be located next to a speaker grill 111A located on one of the side surfaces 105 of the housing 101.

The invention 100 includes a lock switch 128 that works to lock the applicable settings. The lock switch 128 slides back and forth as necessary in order to change or update any of the settings corresponding with the functionality of the invention 100.

The front surface 103 includes a plurality of different buttons 115, 116, 117, 118, 119, 123 and 124 that enable the various functions and settings of the invention 100 to be changed or removed as needed. The buttons 115-119, and 123-124 may toggle the backlight of the display 106 on/off, or turn up/down the volume of the speaker 111, turn on/off the vibrator 112, frequency of sounds or vibrations during a paging function, what tones to emit, frequency of said tones, etc.

The housing 101 may further include a lighting means 170, which may further comprise the use of at least one light emitting diode to provide illumination as needed. The lighting means 170 may be referred to as LEDs flashlight (see FIG. 6), and be provided on one of the side surfaces 105 of the housing 101. The lighting means 170 is wired to the processing means 108, and may work in conjunction with the vibrator 112 or the speaker 111 when emitting an alarm as to the relative location of the housing 101.

The invention 100 may further include a solar panel 171 that is also wired to the powering means 110. The solar panel 171 is located on any of the surfaces of the housing 101, and is used to produce electricity, which may re-charge the powering means 110 in order to prolong use of the invention 100 as is needed.

The invention 100 can be adapted for use in finding other lost objects comprising lost keys, lost cars, lost objects, lost pets, etc.

With respect to the above description, it is to be realized that the optimum dimensional relationship for the various components of the invention 100, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 100.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A key locator device comprising:
   a housing having a processing means in wired communication with a cellular transceiver and a GPS locating means in order to provide two forms of locating means for locating the key locator device;
   wherein the housing includes a display that displays a telephone number when paged via the cellular transceiver;
   wherein the physical location of the key locator device may be determined remotely via a smart phone or computer regardless of whether the key locator device is lost or not;
   wherein the cellular transceiver is located inside of the housing, and operates in a manner consistent with a pager, and which communicates with a cell phone tower in order to receive a page from another telephone/cell phone; wherein the cell phone tower sends a transceiver signal wirelessly to the cellular transceiver, and which generates the paging function with the key locator device.

2. The key locator device as described in claim 1 wherein the housing the housing includes a keychain hole through which a key chain ring and keys are connected therewith.

3. The key locator device as described in claim 1 wherein the housing includes a processing means, which is wired to both the cellular transceiver and the GPS locating means, and which is further wired to a powering means responsible for powering the processing means, the cellular transceiver, the GPS locating means, and the display.

4. The key locator device as described in claim 3 wherein the processing means is wired to a speaker that generates an audible alarm upon receiving the transceiver signal via the cellular transceiver.

5. The key locator device as described in claim 4 wherein the processing means is wired to a vibrator, which vibrates the housing upon receiving the transceiver signal via the cellular transceiver; wherein the processing means is wired to a light, which illuminates the housing.

6. The key locator device as described in claim 3 wherein the processing means is wired to a lock switch, which is located on the housing, and which locks various settings associated with use of the key locator device.

7. The key locator device as described in claim 5 wherein a lighting means is provided on one of the side surfaces of the housing, and is wired to the processing means; wherein the lighting means works in conjunction with the vibrator and speaker to provide illumination in conjunction with their respective use or alone.

8. The key locator device as described in claim 3 wherein a solar panel is wired to the powering means, and is located on any of the surfaces of the housing, and is used to produce electricity, which may re-charge the powering means in order to prolong use of the key locator device.

9. A key locator device comprising:
   a housing having a processing means in wired communication with a cellular transceiver and a GPS locating means in order to provide two forms of locating means for locating the key locator device;
   wherein the housing includes a display that displays a telephone number when paged via the cellular transceiver;
   wherein the physical location of the key locator device may be determined remotely via a smart phone or computer regardless of whether the key locator device is lost or not;
   wherein the cellular transceiver is located inside of the housing, and operates in a manner consistent with a pager, and which communicates with a cell phone tower in order to receive a page from another telephone/cell phone; wherein the cell phone tower sends a transceiver signal wirelessly to the cellular transceiver, and which generates the paging function with the key locator device;
   wherein the housing the housing includes a keychain hole through which a key chain ring and keys are connected therewith.

10. The key locator device as described in claim 9 wherein the housing includes a processing means, which is wired to both the cellular transceiver and the GPS locating means, and which is further wired to a powering means responsible for powering the processing means, the cellular transceiver, the GPS locating means, and the display.

11. The key locator device as described in claim 10 wherein the processing means is wired to a speaker that generates an audible alarm upon receiving the transceiver signal via the cellular transceiver.

12. The key locator device as described in claim 11 wherein the wherein the processing means is wired to a vibrator, which vibrates the housing upon receiving the transceiver signal via the cellular transceiver; wherein the processing means is wired to a light, which illuminates the housing.

13. The key locator device as described in claim 12 wherein the processing means is wired to a lock switch, which is located on a surface of the housing, and which locks various settings associated with use of the key locator device.

14. The key locator device as described in claim 13 wherein a lighting means is provided on one of the side surfaces of the housing, and is wired to the processing means; wherein the lighting means works in conjunction with the vibrator and speaker to provide illumination in conjunction with their respective use or alone.

15. The key locator device as described in claim 14 wherein a solar panel is wired to the powering means, and is located on any of the surfaces of the housing, and is used to produce electricity, which may re-charge the powering means in order to prolong use of the key locator device.

\* \* \* \* \*